March 3, 1970   J. J. SHUTTLEWORTH   3,498,444
CONVEYOR DRIVING DEVICE

Original Filed Dec. 16, 1965   8 Sheets-Sheet 1

*INVENTOR.*
JAMES J. SHUTTLEWORTH
BY Woodard Weikart Emhardt Naughton
*Attorneys*

March 3, 1970   J. J. SHUTTLEWORTH   3,498,444
CONVEYOR DRIVING DEVICE

Original Filed Dec. 16, 1965   8 Sheets-Sheet 2

Fig. 4.

INVENTOR.
JAMES J. SHUTTLEWORTH
BY Woodard Weikart Emhardt Naughton
Attorneys

March 3, 1970  J. J. SHUTTLEWORTH  3,498,444
CONVEYOR DRIVING DEVICE
Original Filed Dec. 16, 1965  8 Sheets-Sheet 3

Fig. 5.

INVENTOR
JAMES J. SHUTTLEWORTH
BY Woodard Weihart Emhardt Naughton
Attorneys

March 3, 1970  J. J. SHUTTLEWORTH  3,498,444
CONVEYOR DRIVING DEVICE
Original Filed Dec. 16, 1965  8 Sheets-Sheet 4

Fig. 6.

INVENTOR.
JAMES J. SHUTTLEWORTH
BY Woodard, Weikart Emhardt Naughton
Attorneys

March 3, 1970 J. J. SHUTTLEWORTH 3,498,444
CONVEYOR DRIVING DEVICE
Original Filed Dec. 16, 1965 8 Sheets-Sheet 5

INVENTOR
JAMES J. SHUTTLEWORTH

March 3, 1970     J. J. SHUTTLEWORTH     3,498,444
CONVEYOR DRIVING DEVICE Original Filed Dec. 16, 1965     8 Sheets-Sheet 7

Fig. 10.

INVENTOR
JAMES J. SHUTTLEWORTH

March 3, 1970   J. J. SHUTTLEWORTH   3,498,444
CONVEYOR DRIVING DEVICE

Original Filed Dec. 16, 1965   8 Sheets-Sheet 8

INVENTOR
JAMES J. SHUTTLEWORTH

United States Patent Office 3,498,444
Patented Mar. 3, 1970

3,498,444
CONVEYOR DRIVING DEVICE
James J. Shuttleworth, 1300 Salamonie Ave.,
Huntington, Ind. 46750
Original application Dec. 16, 1965, Ser. No. 514,205, now Patent No. 3,386,224. Divided and this application May 31, 1968, Ser. No. 739,918
Int. Cl. B65g 47/22
U.S. Cl. 198—135                                    5 Claims

ABSTRACT OF THE DISCLOSURE

A conveyor for moving boxes to be packed with objects in a case packer. A pair of endless chains are received on suitable sprockets and are coupled together by a one-way clutch. One of the chains is moved back and forth by a hydraulic cylinder for driving the conveyor. The other chain has bars thereon which engage and move the boxes and cantilever springs which hold the flaps down. Means are provided for accurately locating a box to be filled when it is moved into position to be filled.

CROSS REFERENCES TO RELATED APPLICATIONS

This is a division of application Ser. No. 514,205, filed Dec. 16, 1965, now Patent No. 3,386,224.

BACKGROUND OF THE INVENTION
Field of the invention

This invention relates to a box conveyor finding particular utility in a case packer.

Description of the prior art

Various devices have been conceived for packing objects in boxes. Some of these devices are shown, for example, in the following United States patents: 2,946,164 to Potts et al.; 3,053,025 to Nigrelli et al.; and Re. 25,852 to Nigrelli et al. In order to insure that the objects are effectively packed in the boxes without breakage of the objects and damage to the boxes, it is desirable that the boxes be accurately positioned to receive the objects and that the flaps on the boxes be controlled during the packing operation. The prior art does not include apparatus which has been completely satisfactory in all respects for the above purposes.

SUMMARY OF THE INVENTION

One embodiment of this invention might include a box conveyor comprising a frame, a flat horizontal member fixed to said frame and having an upper surface across which boxes are moved, an endless first chain with a portion thereof extending alongside and above said surface, bars fixed to and equally spaced along said chain and extending across and above said surface, first sprockets rotatably mounted on said frame and having said chain entrained thereon, a hydraulic cylinder mounted on said frame and having a piston extending through said cylinder, a further chain fixed at one end to one end of said piston and at the other end to the other end of said piston, further sprockets rotatably mounted on said frame and having said further chain entrained thereon, a one-way clutch coupling one of said further sprockets to one of said first sprockets whereby repeated forward stroke projection and reverse stroke retraction of said hydraulic cylinder piston causes intermittent one-way movement of said bars with said movement occurring during said piston's forward stroke, and a plurality of cantilever springs fixed to and equally spaced along said first chain and extending across and above said surface for holding down the flaps of boxes on said horizontal member.

One object of this invention is to provide an improved box conveyor.

Another object of this invention is to provide a conveyor incorporating means for controlling the front or leading flap on a box or case.

Still another object of this invention is to provide a conveyor arranged to accurately position a case or box being filled with objects.

BRIEF DESCRIPTION OF THE DRAWINGS

The full nature of the invention will be understood from the accompanying drawings and the following description and claims.

DESCRIPTION OF THE PREFERRED EMBODIMENTS

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

GENERAL OPERATION

Referring now more particularly to the drawings, there is illustrated a case packer 10 which includes a frame 11. Mounted upon the frame 11 is a box conveyer 12 and a can or other object conveyer 13. Boxes are placed in the opening 15 on the box conveyer 12 and move inwardly to a position beneath the can conveyer 13. The boxes are then moved leftwardly as viewed in FIGS. 1 and 2 until they reach a position beneath a vertically movable vacuum head 16. The vacuum head 16 functions to lift a pattern of cans and then to move the cans downwardly into a respective box positioned beneath the vacuum head 16 and on the box conveyer 12.

Figure 2:
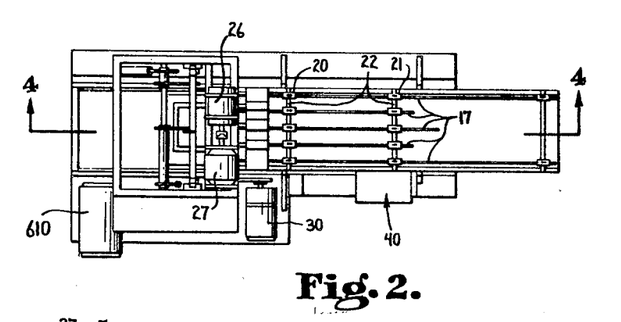
FIG. 2 is a top plan view of the case packer of FIG. 1.
Figure 3:
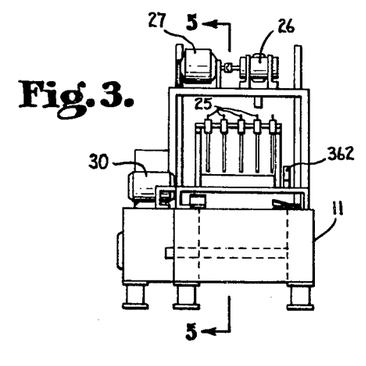
FIG. 3 is an end elevation of the structure of FIGS. 1 and 2.

The objects or cans moving on the conveyer 13 are guided into parallel lines by means of a plurality of guide elements 17 of varying lengths, each of said guide elements being fixed to a pair of mounting members 20 and 21. The mounting members are slidable upon a pair of horizontally extending rods 22 and can be adjusted at any desired position on said rods 22 by manipulation of cap screws 25. The rods 22 are fixed to the frame 11. When the guide members 17 are positioned, as shown in FIGS. 2 and 3, the machine is set for aligning four parallel rows of cans for movement beneath the vacuum head 16. Alternatively the guide members 17 might be arranged to guide two rows of cans or other objects as shown schematically in FIG. 9 (or any number of rows or objects). The vacuum head 16 is supplied with vacuum through a suitable vacuum pump 26 such as a ROOTS AF 24 pump, said pump being driven by suitable motor 27. The object or can conveyer 13 is driven by a suitable motor 30 in a manner described in more detail below.

BOX CONVEYER

The box conveyer 12 actually consists of a pair of conveyers 40 and 41. The conveyer 40 comprises a belt 42 which extends around rollers 45 mounted on a carriage 46. The carriage 46 also supports the primary box conveyer 41 which includes a chain 47 having a plurality of bars 50 fixed to a chain and extending over and under the flat surface 51 defined by the main portion of the carriage 46. When the box is moved to the conveyer 41 and more particularly to the surface 51 by the conveyer 40, the flaps on the box are controlled by a U-shaped guide member 55 fixed to the frame above the second conveyer 40 and by a flap breaker arrangement 56. The U-shaped guide member 55 has a pointed base or distal end 57 which projects somewhat upwardly and somewhat outwardly away from the case packer. When a box is placed upon the conveyer 40, the U-shaped member 55 guides three of the flaps of the box into an outwardly projecting position, these three flaps being the flaps which extend, respectively, rightwardly, toward and away from the viewer of FIG. 1.

The flap breaker 56 incorporates a member 60 which projects from a location 61 closely alongside the box to its distal end 62 just above the edge of the box. The member 60 of the flap breaker functions to push the box against a flange 65 on the carriage 46 and to break the forward flap 66 of the box (that is, the flap which extends leftwardly as viewed in FIG. 1) down against the side of the box bending the flap sufficiently so that it will retain the somewhat downwardly extending position shown in FIG. 4. The lateral position of the flap breaker 56 can be adjusted by means of a thumb screw 67 to move the flap breaker 56 horizontally upon a vertically extending post 70 fixed to the carriage 46. Further guide apparatus 71 is adjustably fixed to the carriage 46 and functions similarly to the flap breaker to hold the box against the flange 65 as the box moves into the conveyer 41.

Figure 1:
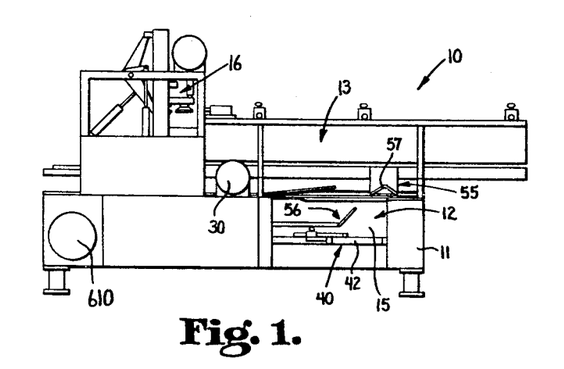
FIG. 1 is a front elevation of a case packer embodying the present invention.
Figure 4:
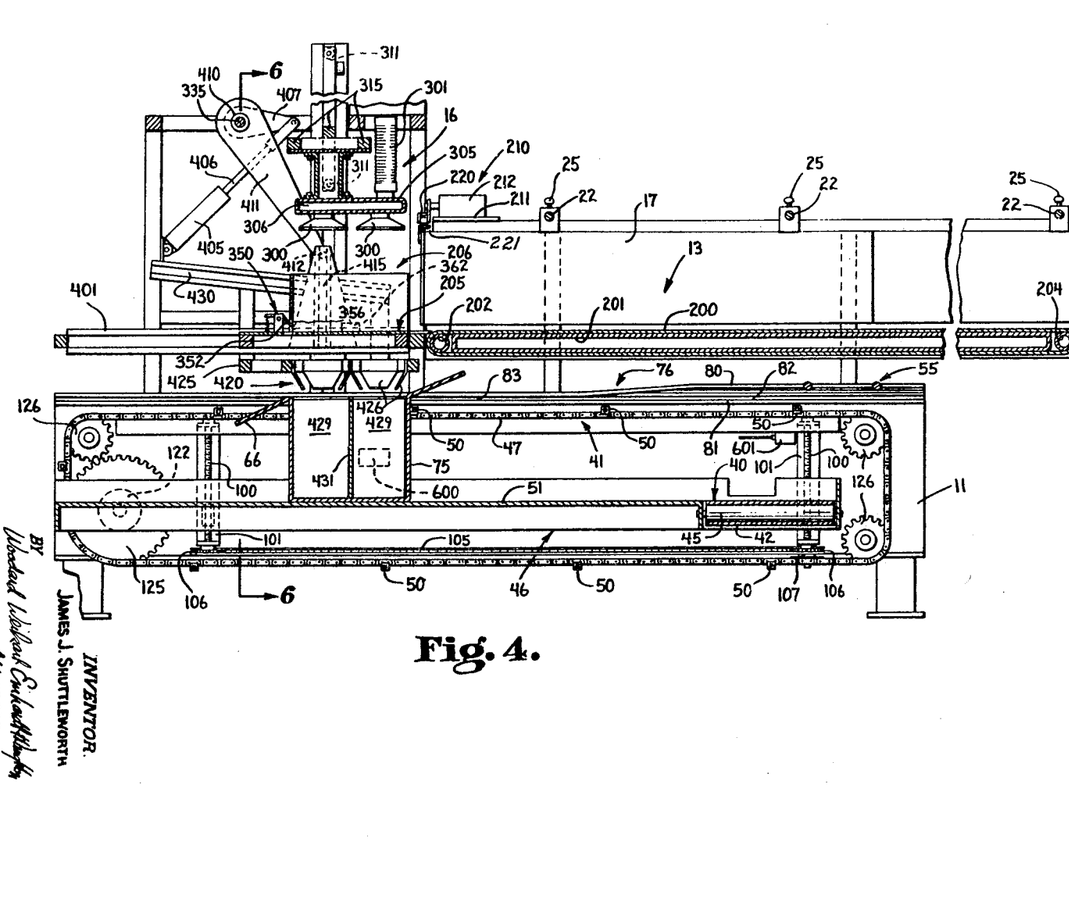
FIG. 4 is an enlarged vertical section taken along the line 4—4 of FIG. 2 in the direction of the arrows.
Figure 6:
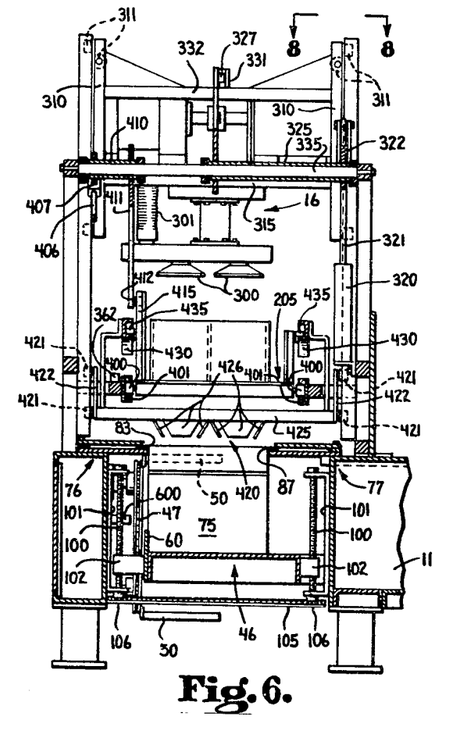
FIG. 6 is a vertical section taken along the line 6—6 of FIG. 4 in the direction of the arrows.

After the box has moved into the case packer as far as it is going to travel on the conveyer 40, the box is moved leftwardly as viewed in FIGS. 1 and 2 by means of the conveyer 41. Thus, the bars 50 of the conveyer 41 step the box leftwardly as viewed in FIG. 4 until it is positioned directly beneath the vacuum head 16. Although only one box is shown in FIG. 4 for clarity's sake, a plurality of boxes will be arranged in order in front of each of the two bars 50 directly to the rear of the bar against which the box 75 is positioned in FIG. 4. Boxes will be fed continuously to the conveyer 41 by the conveyer 40. The two side flaps on the box, that is, the two flaps toward and away from the viewer of FIG. 4, are guided in a horizontal outwardly extending position by flap guide means 76 and 77 (FIG. 6). The U-shaped flap guide 55 is fixed to the flap guide means 76 as shown in FIG. 4 and guides the sideward flap away from the viewer of FIG. 4 between a pair of parallel members 80 and 81 (FIG. 4). It will be noted that the members 80 and 81 are spaced apart a relatively greater distance at 82 than they are at 83 in order to prevent the flap missing the slot between the two members 80 and 81 as the box is moving on the conveyer 40.

Figure 5:
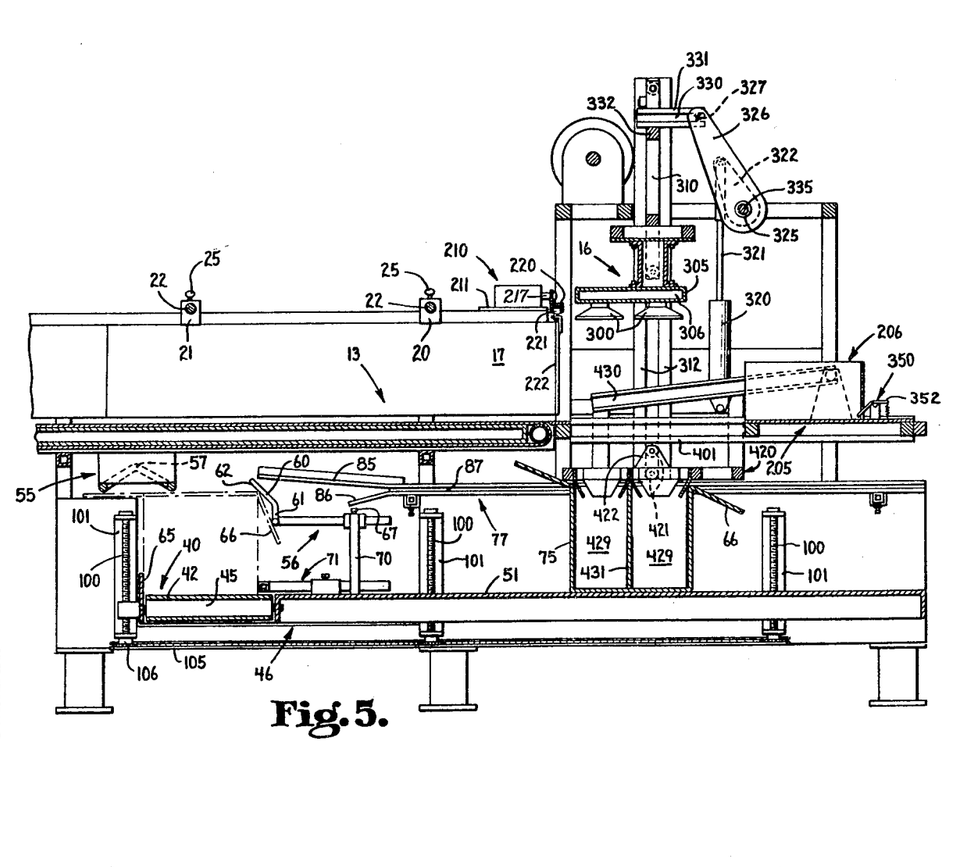
FIG. 5 is an enlarged vertical section taken along the line 5—5 of FIG. 3 in the direction of the arrows.

The flap which is toward the viewer of FIG. 4 is picked up by the flap guide means 77 after the box has completed its movement on the conveyer 40. FIG. 5 perhaps best shows the diverging members 85 and 86 which guide the sideward flap of the box into the slot 87 of the guide means 77. Referring to FIG. 6, the slots 83 and 87 are shown as being directly opposite and opening toward one another. It will also be noted that the guide members 76 and 77 are fixed to the frame 11 and not to the carriage 46.

The carriage 46 is mounted upon the frame 11 and is vertically adjustable relative to the frame by means of screws 100, each of which is journalled in a respective yoke 101 fixed to one side or the other of the frame 11. Each of the screws 100 extends through a projection fixed to and extending from the carriage 46. A chain 105 extends around sprockets 106 each of which is fixed to a respective one of the screws 100. A further sprocket 107 is fixed to one of the screws 100 and is driven through chain 108 and sprocket 109 fixedly mounted on the drive shaft of a motor 110 fixed to the frame 11. The carriage may be raised or lowered by operating the motor 110 in one direction or the other. Since the flap guide means 76 and 77 are not vertically adjustable, any vertical adjustment necessary for different depths of boxes is made by means of the motors 110 and screws 100.

Figure 7:
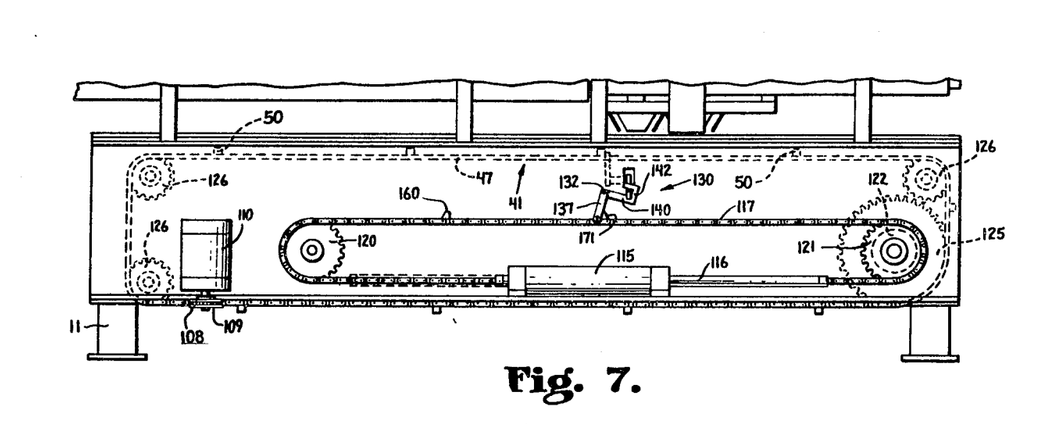
FIG. 7 is an enlarged fragmentary side elevation taken from the right side of the apparatus as viewed in FIG. 3 with a cover plate removed to show internal operating apparatus.

The conveyer 41 is powered by a hydraulic cylinder 115 (FIG. 7), said hydraulic cylinder having a piston 116 which extends completely through the cylinder 115 and is movable between the solid line position of FIG. 7 and the dotted line position thereof. A chain 117 is engaged around sprockets 120 and 121 rotatably mounted upon the frame 11. The sprocket 121 is fixedly secured to a one-way clutch 122 which couples the sprocket 121 and a further sprocket 125 also rotatably mounted upon the frame 11. The further sprocket 125 along with additional sprockets 126 (FIGS. 4 and 7) has the chain 47 engaged thereon. As mentioned above, the chain 47 has the bars 50 fixed thereto and is used to step the boxes forwardly to their loading position and out of the apparatus. This stepping action is effected by projecting and retracting the piston 116, that is, by moving the piston 116 between the solid and dotted line position of FIG. 7.

Figure 8:
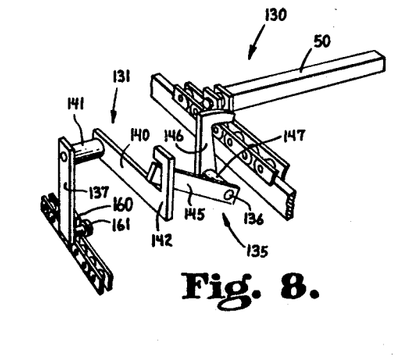
FIG. 8 is a perspective fragmentary view of the operating portions of apparatus making up the box conveyor of the present invention.

When the piston 116 is moved from the dotted line to the solid line position, there is no movement of the chain 47 because of the free wheeling of the one-way clutch 122. When the piston is moved from the solid line to the dotted line position, however, the bars 50 are advanced by the chain 47 one complete position. That is, one of the bars 50 moves to the position previously occupied by a next adjacent bar 50. This stepping action is accurately metered by means of a mechanism 130 (FIGS. 7 and 8). The mechanism 130 consists of an element 131 swingably mounted on the frame 11 about an axis 132 and a further element 135 swingably mounted on the frame 11 about an axis 136. The element 131 consists of the two levers 137 and 140 which are fixed together by the member 141. It will be noted that the member 140 has a hook 142 in its distal end, said hook cradling the lever 145 forming a part of the element 135. The element 135 further includes a stop member 146 which is fixed to the lever 145 by the member 147.

Figure 9:
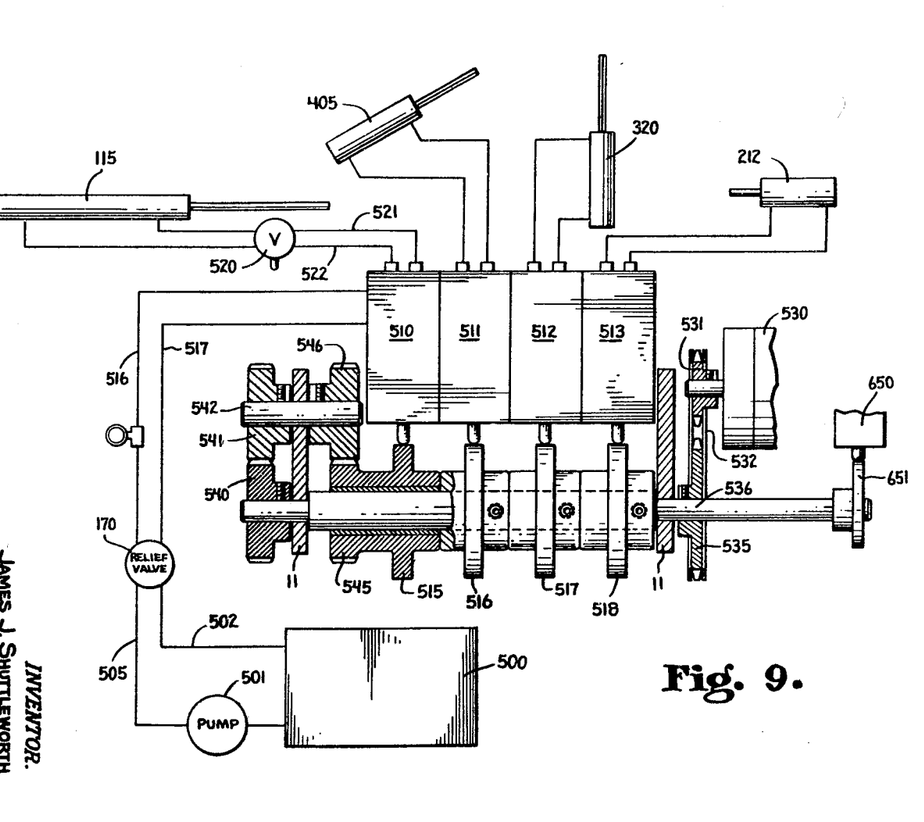
FIG. 9 is a somewhat schematic view of the hydraulic circuit of the present inventon.

Assume now that the cylinder 115 moves the piston 116 from the solid to the dotted line position. This will also cause the dog 160 fixed to the chain 117 to move rightwardly and to engage the member 161 fixed to the lever 137. Thus, the lever 137 will be moved rightwardly as viewed in FIG. 7 swinging the lever 140 with its hook 142 upwardly forcing the lever 145 upwardly and causing the stop member 146 to swing downwardly in front of the next bar 50. The dog 160 is so located on the chain 117 that it engages the member 161 just prior to the piston 116 completing its stroke. Thus, when the bar 50 engages the stop 146 stopping the bar 50 and the chain 47, the piston 116 cannot complete its possible stroke and the pressure in the hydraulic cylinder 115 is relieved by a suitable relief valve 170 (FIG. 9).

In FIG. 7 the member 161 is shown engaged by a further dog 171. This engagement occurs when the piston 116 is completing its stroke rightwardly as viewed in FIG. 7 and moving to the solid line position. As mentioned, the chain 47 does not move. When the dog 171 engages the member 161, the stop 146 is moved out of the way of the bar 50 so that the next forward movement of the chain 47 is permitted. It will be noted that when the box 75 is in the position shown in FIG. 4, it is ready for loading by the vacuum head 16. After such loading, the box is stepped leftwardly as viewed in FIG. 4 until it moves off of the surface 51 of the carriage 46 and empty boxes are simultaneously stepped into loading position. Suitable means for receiving the boxes being stepped off the conveyor should be provided.

CAN CONVEYER

The can conveyer 13 includes a belt 200 which is supported by an elongated support assembly 201 and which rides upon rollers 202 and 204. The roller 202 is driven by the motor 30 which operates to continually move the upper portion of the belt 200 leftwardly as viewed in FIG. 4. A pan or platform 205 is aligned with and adjacent to the conveyer 13 when the platform is in the position of FIG. 4. The platform 205 has fixedly mounted thereon a can pattern forming assembly 206. Unlike the example shown in FIGS. 1, 2 and 3, the case packer of the remaining figures is shown with only two parallel rows for relatively large cans instead of the four parallel rows for smaller cans shown in FIGS. 1, 2 and 3.

The cans which are resting on the conveyor 13 must be held in position temporarily while the cans on the platform 205 are packed into the box. This holding is accomplished by the holdback mechanism 210 illustrated in FIGS. 4 and 5. The frame 11 has fixed thereto a horizontal flat member 211 which has a hydraulic cylinder 212 fixed to its upper surface. The piston 217 of the hydraulic cylinder 212 is fixed to a channel member 220 (FIG. 4), the channel of which opens downwardly and receives rollers 221 rotatably mounted upon doors or gates 222. When the piston 217 of the hydraulic cylinder 212 is projected, the channel 220 moves the rollers 221 to cause the doors 222 to move to a position in alignment with the guide members 17. This is the position in which the doors are located when the cans are moving onto the platform 205. When it is desired to stop the cans, the hydraulic cylinder 212 retracts its piston 217 causing the doors 222 causing the doors to block further movement of the cans.

VACUUM HEAD AND FUNNEL

In order for the cans to be moved into the box 75, the vacuum head 16 must come down to the cans and engage the cans by means of vacuum cups 300. The cups 300 must then raise the cans away from the platform and the platform move out of the way so that the vacuum head can lower the cans down into the box 75. Because the vacuum head 16 must move relative to the vacuum pump 26, the vacuum head is connected to the pump by a bellows-type conduit 301 which automatically lengthens and shortens with movement of the vacuum head. The vacuum head 16 includes a housing 305 which has a hollow interior 306 leading to the vacuum cups 300. The vacuum head 16 further includes a pair of vertical members 310 each of which has four rollers 311 rotatably mounted thereon. The rollers 311 ride between and against vertical members 312 fixed to the frame and defining a track arrangement. Two of the rollers 311 ride between the members 312 while two ride against one of the members 312. The hollow housing 305 of the head is fixed to the vertically extending members 310 by a suitable supporting assembly which includes horizontally extending rods 315. A plurality of different sized and shaped vacuum heads may be supplied for different patterns or sizes of containers.

The vacuum head is raised and lowered by a hydraulic cylinder 320, the piston 321 of which is pivotally connected to a lever 322 which is fixed to a sleeve 325, in turn fixed to a further lever 326. The further lever 326 has rotatably mounted at its distal end a roller 327 which rides in a track 330 in a channel 331 fixed to the horizontal member 332 forming a part of the vacuum head 16. The shaft 335 fixed to the frame 11 provides means for pivotally mounting the sleeve 325. The vacuum head 16 may be raised and lowered by projecting and retracting respectively the piston 321 of the hydraulic cylinder 320. Because of the relatively greater moment arm of the lever 326 as compared to the lever 322, substantially greater movement of the vacuum head 16 is produced as compared to the movement of the piston 321.

Referring again to FIG. 4, the platform 205 has additionally mounted thereon actuating mechanism 350 which includes actuating arms 352 normally retained in an upward position by springs or in other words clockwise position as viewed in FIG. 5. As shown in FIG. 4, the actuating arms 352 extend through apertures 356 inside of the pattern forming assembly 206 where the arms 352 can be engaged by the cans in the pattern. The arms 352 actuate an electrical switch 362 described below in connection with the electrical schematic when the pattern of cans on the platform is complete.

The platform 205 is movable horizontally by reason of its four rollers 400 (FIG. 6) which support the platform in horizontal position and ride within the tracks 401 mounted on the frame 11. The platform 205 is moved by means of a hydraulic cylinder 405 having a piston 406, the distal end of which is pivotally connected to a lever 407. The lever 407 is fixed to a sleeve 410 which is journalled upon the shaft 335. Also fixed to the sleeve 410 is a lever 411 at the distal end of which is mounted a roller 412 which rides within the vertically extending track 415 fixed to the platform 205. When the piston 406 is retracted, the lever 411 is rotated clockwise as viewed in FIG. 4 causing the platform 205 to move leftwardly in the tracks 401 and away from the conveyer 13.

A funnel arrangement 420 is provided with vertically spaced rollers 421 which ride within the tracks defined by the vertical members 312, in other words, the same tracks within which the rollers 311 ride. Because the mounting members 422 upon which the rollers 421 are rotatably mounted are fixed to the funnel, the funnel is movable only in a vertical direction. The funnel consists of the frame members 425 and the funnel elements per se 426 which taper inwardly and are designed to guide the cans into the particular openings 429 in the box 75, said openings being defined by the partition 431. The funnel 420 also functions to hold the box in position when loading of the box is being effected. The funnel is automatically moved down into the loading position when the platform 205 moves away from the position illustrated in FIG. 4 and leftwardly toward the end of the track 401. This automatic movement is accomplished by means of a pair of cam tracks 430 which are fixedly mounted on the funnel and which slope upwardly and leftwardly as viewed in FIG. 4. The platform 205 has rotatably mounted thereon rollers 435 which ride in the cam tracks 430 as the platform moves leftwardly as viewed in FIG. 4. Of course, rightward movement of the platform 205 as viewed in FIG. 4 causes the funnel to be raised from the downward position shown in FIG. 5 to the upward position shown in FIG. 4.

HYDRAULIC SYSTEM

Referring to FIG. 9, there is illustrated the hydraulic system of the present apparatus which includes a hydraulic tank 500 and a pump 501. The pump 501 is connected to the relief valve 170 through which hydraulic fluid can be returned to the tank through the line 502 when the pressure in the line 505 becomes too great. Pressurized hydraulic fluid from the pump 501 is delivered to four-way valves 510, 511, 512 and 513 through line 516 and returned to the tank through lines 517 and 502. The four-way valves 510, 511, 512 and 513 are actuated by means of respective cams 515, 516, 517 and 518. A further four-way valve 520 is placed in the lines 521 and 522 leading to and from the hydraulic cylinder 115 which operates to index the boxes forwardly into and through loading position. The four-way valves 510–513 may be, for example, #25 P(EE) Gresen hydraulic valves.

The four-way valve 511 controls flow of hydraulic fluid to the hydraulic cylinder 405 which retracts the platform 205. The four-way valve 512 controls flow of hydraulic fluid to the hydraulic cylinder 320 which raises and lowers th evacuum head 316 The four-way valve 513 controls flow of hydraulic fluid to the hydraulic cylinder 212 which controls the doors of gates 222. One of the important advantages of the present case packer is the fact that the indexing of the boxes can be slowed down so that two or more layers of cans or other objects are packed into a single box. This is accomplished by causing the four-way valve 510 to complete only one cycle for every two or more cycles of the four-way valves 511–513.

The motor 530 is provided with a sprocket 531 which drives a chain 532 which in turn drives a sprocket 535. The sprocket 535 is fixed to a shaft 536 rotatably mounted on the frame 11. As shown in FIG. 9, the gears 540 and 541 are equal in size and have an equal number of teeth. These gears can be replaced, however, by a smaller gear for the gear 540 and a larger gear for the gear 541, said replacement gears having a two to one gear ratio so that shaft 542 rotatably mounted on the frame 11 rotates once for each two rotations of the shaft 536. The cam 515 is integral with a gear 545 which is driven by gear 546 fixed to the shaft 542. Gear 545 is journalled on shaft 536 so that cam 515 and gear 545 are free to rotate at one half the speed of the shaft 536. The latter described arrangement is suitable for providing two layers of cans or objects in a box being packed. Of course, different replacement gears with the proper gear ratios can replace gears 540 and 541 for packing three, four, five or more layers.

It should be understood that the intended stroke of the vacuum head 16 is down to the box so that the vacuum head carries the first layer almost all the way into its intended location in the box. When a second and more layers are packed, the vacuum head 16 stalls out against the first and any preceeding layers. In other words, the possible stroke of the hydraulic cylinder 320 is not completely used and the relief valve 170 prevents the hydraulic pressure from becoming unduly great.

ELECTRICAL CIRCUIT AND OPERATION

Various limit switches in addition to limit switch 362 are provided for sensing the various operating positions of the apparatus. Referring to FIGS. 3 and 4, the limit switch 362 is located on the side of the case packer adjacent to the platform 205 and is mounted on the frame 11. As mentioned, the function of the limit switch 362 is to indicate when the pattern of cans in the pan or platform is complete and is ready to be lowered into the box or carton.

Figure 10:
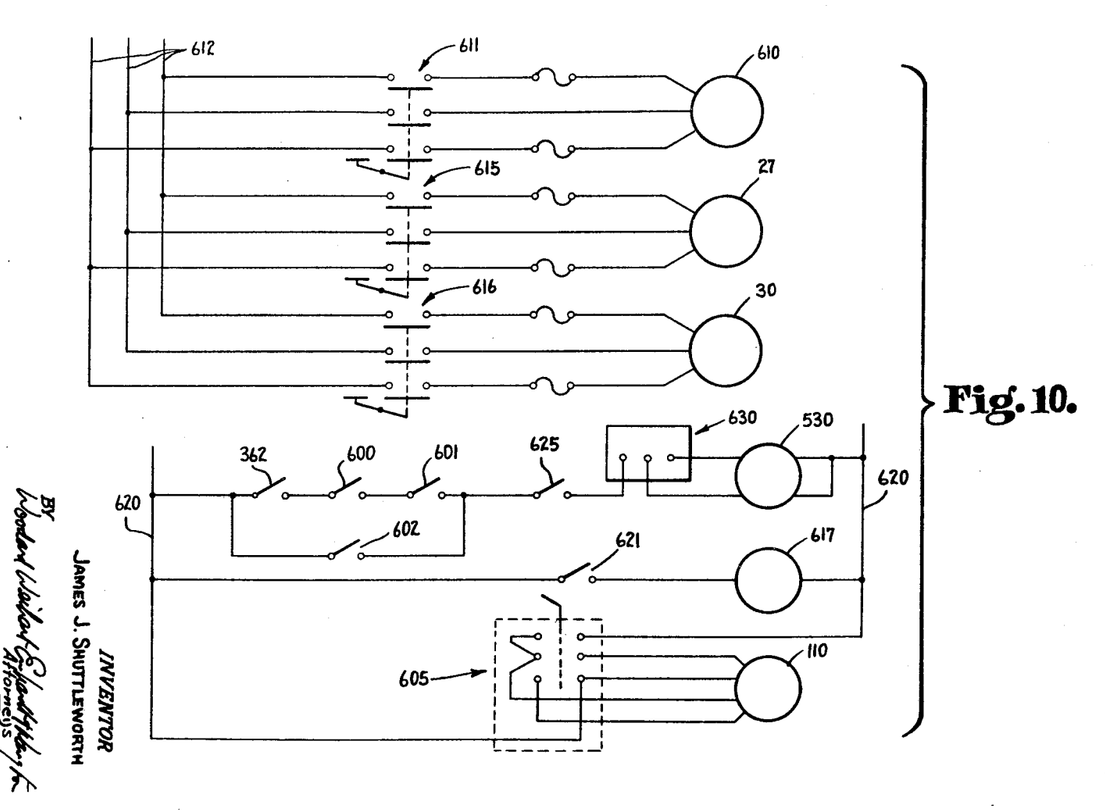
FIG. 10 is a schematic view of the electrical circuit of the present invention.

A further limit switch 600 (FIGS. 4 and 10) is also mounted upon the frame 11 and has its actuating arm positioned to be engaged by a box or carton such as the carton 75 when the box or carton is positioned in the loading position as shown in FIG. 5. The limit switch 600 functions to indicate when the carton is properly positioned in the loading position. A further limit switch 601 (FIGS. 4 and 10) is positioned at the end of travel of a box moving on the conveyor 40. The purpose of the limit switch 601 is to indicate when a carton is in proper position to be indexed by the conveyor 41. A further limit switch 602 (FIG. 10) is mounted upon the horizontal flat member 211 and has its actuating arm positioned to be operated by the channel member 220. The limit switch 602 indicates or is closed when the gate or doors 222 are closed and preventing further movement of the cans on the conveyor 13. As can be seen in FIG. 10, the limit switch 602 is in parallel with switches 362, 600 and 601 so that during certain portions of the cycle operation of the switch 602 overrides operation of switches 362, 600 and 601.

The electrical circuit of the present mechanism will be described in further detail in connection with a description of the operation of the device. The carriage 46 is adjusted to the proper height by operation of the motor 110. As shown in FIG. 10, a reversing switch 605 is provided which can be manipulated to cause the motor 110 to raise or lower the carriage 46. When the carriage 46 is properly adjusted to the desired height for the boxes or cartons to be used, the switch 605 is set so that the motor 110 is turned off. The motor 110 does not operate during the case packing cycle. The switch 605 may be a commercially available AB reversing drum 350 TAV 32 manufactured by the Allen Bradley Company of Milwaukee, Wis.

The hydraulic pump motor 610 which drives the hydraulic pump 501 is then turned on by manipulation of the switch 611 connecting the motor 610 across the 220 volt three-phase supply lines 612. Hydraulic fluid under pressure is then supplied to the four-way valves 510, 511, 512 and 513. The vacuum pump motor 27 is then turned on by means of the switch 615 connecting the motor 27 across the lines 612. Also, the can conveyor motor 30 is started in similar fashion by throwing the switch 616.

A further motor 617 (FIG. 10) is provided for driving the conveyer 40 in order to move boxes onto the conveyer carriage 46. The motor 617 is connected across 110 volt lines 620 by closing the switch 621.

At this stage in the operation of the present device, cam 515 is in its uppermost position having just caused valve 510 to have indexed out a full box. Cam 516 has allowed the valve 511 to force the platform or pan 205 to the position illustrated in FIG. 4 adjacent to the conveyer 13. Cam 517 holds valve 512 open so that the vacuum head assembly 16 is in the raised position of FIG. 4.

A box is placed upon the conveyer 40 and moves into the conveyer 41 into engagement with the limit switch 601 closing the contacts of the limit switch. This box or carton is then indexed to the next forward station on the conveyer 41 by manually operating the hydraulic valve 520. The above steps of feeding in cartons on the conveyor 40 and indexing them on the conveyor 41 are repeated until such time as the lead carton is in loading position as shown by the carton 75 in FIG. 4 with the carton directly under the platform 205 and under the vacuum head 16. In this position, the limit switch 600 is closed by the engagement of the box 75 with the limit switch actuating arm closing the contacts of the limit switch 600.

The operator then throws switch 625 which is in series with the limit switches 600 and 601 and also in series with the limit switch 362. Closing of the switch 625 does not operate the cam motor 530 until such time as the limit switch 362 is closed by the proper forming of a pattern of cams on the platform 205. When all of the switches 362, 600 and 601 are closed, the cam motor 530 will be operated through the starting relay 630 and from the 110 volt supply line 620.

When the cams begin to rotate, the cam 518 actuates the actuating arm of the four-way valve 513 causing the hydraulic cylinder 212 to retract its piston 317 and to close the gates 222. This action, as mentioned, breaks up any jams in the cans on the conveyer 13 by backward movement of the cans and also prevents any further movement of the cams off the conveyer 13. The vacuum head 16 is also caused to descend by operation of the four-way valve 512 through the cam 517 which in turn provides hydraulic fluid to the cylinder 320. The operation of the hydraulic cylinder 212 to retract its piston and to move the channel 220 rightwardly also actuates the switch 602, said switch 602 being in parallel with the series connection of switches 362, 600 and 601, thus locking in the cam motor 530 even though one or more of the switches 362, 600 and 601 subsequently opens. The vacuum pump 26 normally exerts vacuum on the vacuum cups 300 except when the vacuum is cut off by operation of a suitable valve 650 controlled by the cam 651. The valve 650 is caused to shut off vacuum only when the cups 300 release the cams. The cam 517 is so designed as to reverse the four-way valve 512 after the cams have been engaged by the vacuum cups so that the vacuum head raises slightly and lifts the cam away from the platform 205.

Just after the cams have been lifted off of the platform, the cylinder 405 is caused to move the platform leftwardly as viewed in FIG. 4 by the cam 516 actuating the four-way valve 511. As explained above, such leftward movement of the platform automatically drops or moves downwardly the funnel 420 to appropriate position to guide the cams into the box. When the platform reaches fully retracted position and the funnel 420 is moved fully downwardly, the cam 517 suitably actuates the valve 512 to operate the cylinder 320 to lower the pattern of cans through the funnel into the carton. At the bottom of the stroke of the vacuum head, the above mentioned vacuum valve is actuated by the cam 651 to port the vacuum head to atmosphere and to shut off the vacuum so that the can pattern is released into the box. The cam 517 also operates the valve 512 to cause the cylinder 320 to retract the vacuum head back to its uppermost position. Immediately after the upward movement of the vacuum head out of the way of the platform 205, the cylinder 405 is operated through the cam 516 and the four-way valve 511 to move the platform from the position of FIG. 5 back to the position of FIG. 4. Continued rotation of the cams causes the cam 515 to actuate the cylinder 115 through the four-way valve 510 to project the piston 116 from the solid line position to the dotted line position of FIG. 7 indexing the now loaded box 75 leftwardly from the position of FIG. 4 and replacing the now loaded box 75 with an empty box. The cam 515 is so designed that it next operates the four-way valve 510 to return the piston 116 from the dotted line position to the solid line position of FIG. 7.

The final function of the cycle is completed as the gates or doors 222 are opened by projecting of the piston 217 of the hydraulic cylinder 212 by operation of the four-way valve 513 through the cam 518. The opening of the doors 222 permits the cams to again be moved onto the platform to begin the filling up of the pattern. When the gates or doors 222 open, the switch 602 is also caused to open which shuts off the cam motor 530 so that the cycle cannot be repeated until such time as the three switches 362, 600 and 601 are closed by the respective filling of the platform with cams, proper positioning of the empty box in loading position and movement of an empty box on the conveyer 40 into indexing position for movement on the conveyer 41.

Figure 11:
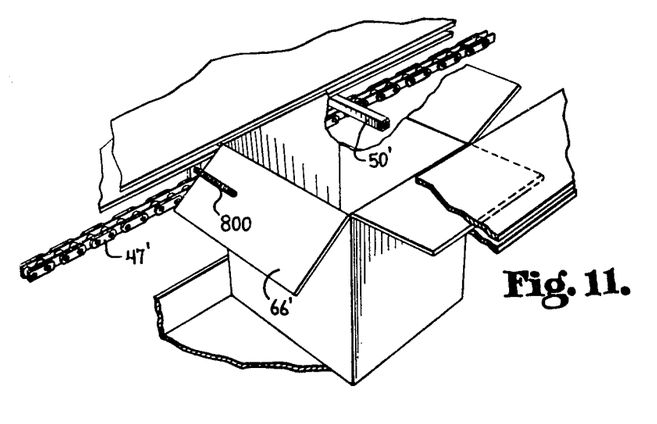
FIG. 11 is a perspective view of an alternative embodiment of the invention.
Figure 12:
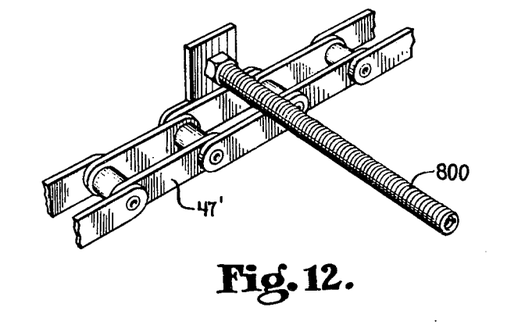
FIG. 12 is an enlarged perspective view of a portion of the structure of FIG. 11.

Referring to FIGS. 11 and 12, an alternative embodiment of the invention is illustrated. The embodiment of FIGS. 11 and 12 is identical to that of FIGS. 1–10 except that cantilever springs 800 (only one shown) are used and are fixedly mounted at their proximal ends to the chain 47' corresponding to chain 47. Each of the springs 800 are tightly coiled so that they normally maintain themselves rigid to hold down the leading flap 66' which corresponds to the flap 66 in FIGS. 4 and 5. Each of the springs 800 is appropriately and equally spaced from a respective one of the bars 50' corresponding to the bars 50 of FIGS. 4 and 7. Thus the flap breaker 56 of FIG. 5 acts to feed the lead flap 66' behind the respective springs 800. The advantage of using the spring 800 instead of a completely rigid member is that the spring can bend and move past the box at the end of travel of the conveyer 41. The embodiment of FIGS. 11 and 12 is particularly useful in the frequent situation wherein the box flap 66 or 66' cannot be or should not be overbent as described above in connection with FIGS. 1–10. The spring holds the lead flap down and makes unnecessary such overbending. It should be mentioned that because the springs are mounted on chain links they can be easily relocated to provide for different sized boxes.

It will be evident from the above description that the present invention provides an improved case packer.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

The invention claimed is:

1. A box conveyor comprising a frame, a flat horizontal member fixed to said frame and having an upper surface across which boxes are moved, an endless first chain with a portion thereof extending alongside and above said surface, bars fixed to and equally spaced along said chain and extending across and above said surface, first sprockets rotatably mounted on said frame and having said chain entrained thereon, a hydraulic cylinder mounted on said frame and having a piston extending through said cylinder, a further chain fixed at one end to one end of said piston and at the other end to the other end of said piston, further sprockets rotatably mounted on said frame and having said further chain entrained thereon, a one-way clutch coupling one of said further sprockets to one of said first sprockets whereby repeated forward stroke projection and reverse stroke retraction of said hydraulic cylinder piston causes intermittent one-way movement of said bars with said movement occurring during said piston's forward stroke, and a plurality of cantilever springs fixed to and equally spaced along said first chain and extending across and above said surface for holding down the flaps of boxes on said horizontal member.

2. A box conveyor comprising a frame, a flat horizontal member fixed to said frame and having an upper surface across which boxes are moved, an endless first chain with a portion thereof extending alongside and above said surface, bars fixed to and equally spaced along said chain and extending across and above said surface, first sprockets rotatably mounted on said frame and having said chain entrained thereon, a hydraulic cylinder mounted on said frame and having a piston extending through said cylinder, a further chain fixed at one end to one end of said piston and at the other end to the other end of said piston, further sprockets rotatably mounted on said frame and having said further chain entrained thereon, a one-way clutch coupling one of said further sprockets to one of said first sprockets whereby repeated forward stroke projection and reverse stroke retraction of said hydraulic cylinder piston causes intermittent one-way movement of said bars with said movement occurring during said piston's forward stroke, a first lever pivoted on said frame and movable between a blocking position in the path of said bars and a removed position out of the path of said bars, and means associated with said further chain for moving said lever into blocking position just prior to said hydraulic cylinder reaching the end of a forward stroke of movement of said first chain, said last mentioned means also for moving said lever to removed position just prior to said hydraulic cylinder reaching the end of a reverse stroke.

3. The box conveyor of claim 2 wherein said means for moving comprises a pair of dogs fixed to said further chain, and a second lever pivoted to said frame and having a hook thereon cradling said first lever, one of said dogs being positioned to engage said second lever just prior to said hydraulic cylinder reaching the end of a forward stroke of movement of said first chain, the other of said dogs being positioned to engage said second lever just prior to said hydraulic cylinder reaching the end of a reverse stroke.

4. The box conveyor of claim 3 additionally comprising a plurality of cantilever springs fixed to and equally spaced along said first chain and extending across and above said surface for holding down the flaps of boxes on said horizontal member.

5. A box conveyor comprising a member having a surface across which boxes are moved, an endless chain with a portion thereof extending alongside and above said surface, means to drive said chain bars fixed to and spaced along said chain and extending across and above said surface for pushing boxes on said surface, and a plurality of cantilever springs fixed to and spaced along said chain and extending across and above said surface for holding down the flaps of boxes on said surface.

References Cited

UNITED STATES PATENTS

| 2,960,965 | 11/1960 | Cordis | 198—135 |
| 3,051,197 | 8/1962 | Zomer | 92—137 |

FOREIGN PATENTS

| 1,012,238 | 7/1957 | Germany. |

RICHARD E. AEGERTER, Primary Examiner

U.S. Cl. X.R.

198—171